(No Model.)
T. FLAHERTY.
ELECTRIC STREET LAMP POST.
No. 476,739. Patented June 7, 1892.
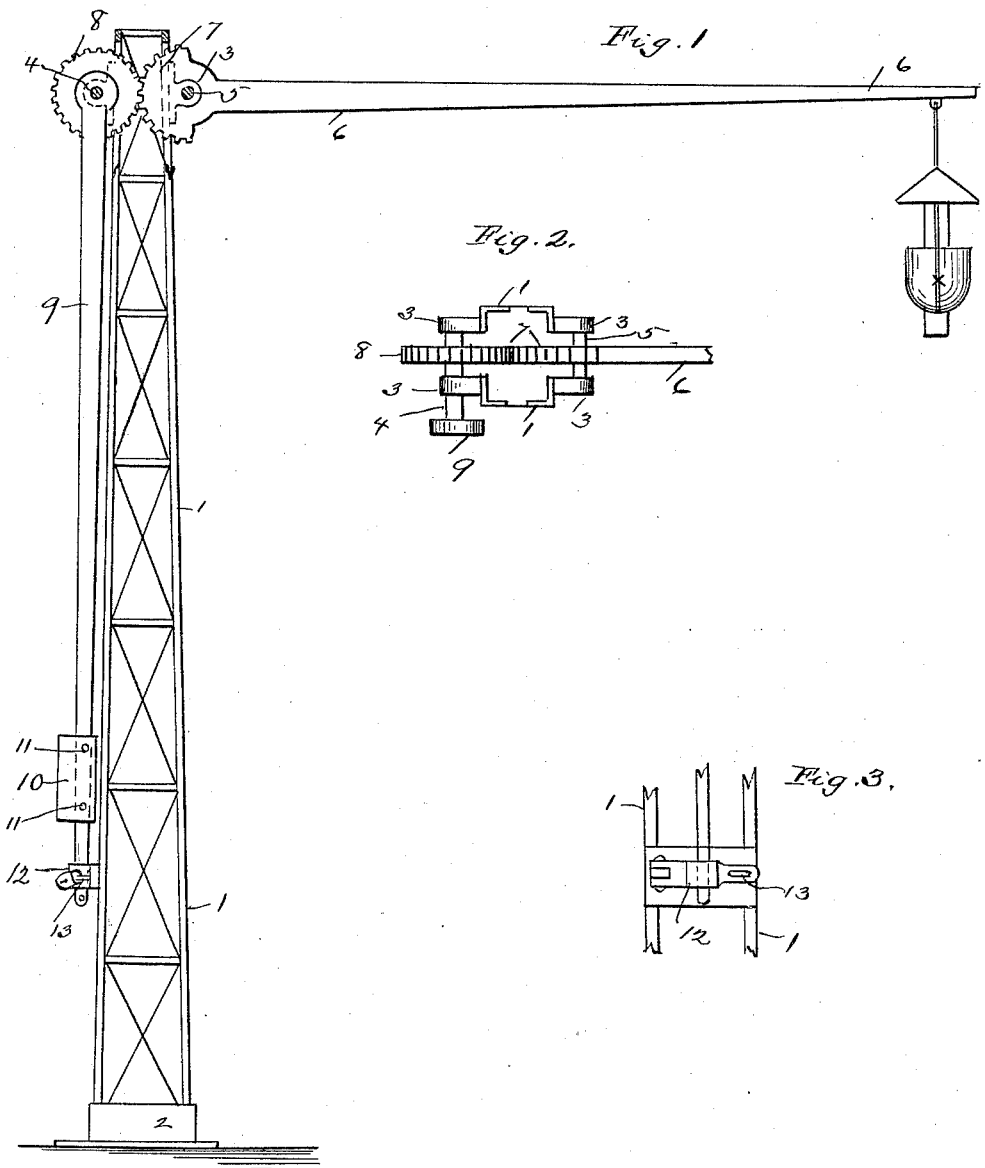

United States Patent Office.

THOMAS FLAHERTY, OF PITTSBURG, PENNSYLVANIA.

ELECTRIC-STREET-LAMP POST.

SPECIFICATION forming part of Letters Patent No. 476,739, dated June 7, 1892.

Application filed March 23, 1891. Serial No. 386,105. (No model.)

*To all whom it may concern:*

Be it known that I, THOMAS FLAHERTY, a citizen of the United States, residing at Pittsburg, in the county of Allegheny and State of Pennsylvania, have invented certain new and useful Improvements in Electric-Street-Lamp Posts; and I do hereby declare the following to be a full, clear, and exact description of the invention, such as will enable others skilled in the art to which it pertains to make and use the same, reference being had to the accompanying drawings, which form a part of this specification.

My invention relates to certain improvements in mast-arms for electric-arc lamps, and has for its object the production of a simple, durable, and cheap device of the character set forth, by the use of which the labor and time required in the raising and lowering of the lamp will be materially lessened.

To these ends the invention consists in certain peculiarities in the construction, arrangement, and combination of the several parts, substantially as hereinafter described, and particularly pointed out in the subjoined claims.

In the accompanying drawings, Figure 1 is a side elevation of my improved mast-arm, which is constructed in accordance with my invention. Fig. 2 is a plan view showing the arrangement of gearing which connects the two arms together. Fig. 3 is a side elevation of the locking device for the lower arm.

To put my invention into practice, I provide a wrought-iron post 1 of a suitable size and form of construction, having a base-plate 2 or other means of securing the same in the ground. Mounted in suitable bearings 3 at the top of this post 1 are two short shafts 4 5, placed opposite to each other, to one of which 5 is rigidly attached an outwardly-extending arm 6, having an enlarged hub 7, and semicircular rack formed on the inner periphery of the same. This rack meshes with a toothed wheel 8, attached to the shaft 4. Secured to said shaft 4 is a downwardly-extending arm 9, which projects to a point within a short distance of the ground and is provided with an adjustable weight 10, which may be secured at any point along the arm by means of setscrews 11. Hinged to the post at a point a short distance above the ground is a hasp 12 and staple 13, which serve as a means for securing the arm 9 to the post 1, and thereby hold the arm 6 in a horizontal position.

In operation an arc lamp is attached to the outer extremity of the horizontal arm 6, and if it is desired to lower the same to within reach of the ground the hasp 12 is released and a rope attached to the end of the arm 9, and the same permitted to swing upward by the weight of the lamp and arm 6, thus reversing the position of the two arms. To elevate the lamp to its former position, the arm 9 is drawn down and the same secured to the post 1.

The advantages of the above construction will be readily seen. It is not only extremely simple and durable in its construction, but, as it is only necessary to release the arm 9 in order to cause the lamp, with its supporting-arm, to lower to a point within easy reach of the operator or attendant and to pull said arm downward in order to raise the lamp and its supporting-arm to their original or normal positions, a material saving both in the labor and time of the attendant is had, the importance of which will be readily appreciated. The weight 10 being adjustable on the arm 9 can be secured thereon at the point which will permit the arm 6 and lamp from overbalancing the arm 9 too much, which would cause said lamp to descend too rapidly, thereby also adapting the device to lamps of different weights.

Having thus described my invention, I claim—

1. The herein-described mast-arm for electric lights, comprising a post having shafts journaled at its top, a normally-horizontal arm 6, attached at its inner end to one of said shafts and adapted to support a lamp at its outer end, a normally-vertical arm 9, attached at its upper end to the other of said shafts, in gear with said arm 6 and having a weight so placed as to cause it to be nicely overbalanced by said arm 6 and lamp, for the purpose specified, and a means for locking said arm 9 to said post for holding said arm 6 in its horizontal position.

2. The herein-described mast-arm for electric lights, consisting of the post 1, the shafts 4 5, mounted in bearings near the top of the same, the normally-horizontal arm 6, secured to said shaft 3 and having an integral toothed segment, the gear-wheel 8, secured to said shaft 4 and engaging said toothed segment, a downward-extending arm 9, secured at its upper end to said shaft 4 and provided with a weight, and a means for locking said arm 9 to the post, substantially as described.

3. The herein-described mast-arm for electric lamps, which consists of a post, the shafts journaled in bearings in the upper end of said post, the toothed wheel on one shaft, the projecting arm on the other shaft, having an enlarged hub provided with a segmental rack arranged to mesh with the toothed wheel, the downwardly-extending arm secured to the shaft of said toothed wheel, a weight adapted to be adjusted vertically on said arm, and a hasp and lock arranged to secure the arm in a rigid position, substantially as described.

In testimony that I claim the foregoing I hereunto affix my signature this 24th day of February, A. D. 1891.

THOMAS FLAHERTY. [L. S.]

In presence of—
CHARLES LARGE,
M. E. HARRISON.